(12) United States Patent
Huang

(10) Patent No.: US 10,949,112 B2
(45) Date of Patent: Mar. 16, 2021

(54) DATA PUSH METHOD AND DEVICE, STORAGE MEDIUM, AND ELECTRONIC DEVICE

(71) Applicant: TENCENT TECHNOLOGY (SHENZHEN) COMPANY LIMITED, Shenzhen (CN)

(72) Inventor: Jianxiang Huang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 142 days.

(21) Appl. No.: 16/357,797

(22) Filed: Mar. 19, 2019

(65) Prior Publication Data

US 2019/0212939 A1 Jul. 11, 2019

Related U.S. Application Data

(63) Continuation of application No. PCT/CN2018/075778, filed on Feb. 8, 2018.

(30) Foreign Application Priority Data

Feb. 27, 2017 (CN) .......................... 201710109224.X

(51) Int. Cl.
*G06F 3/06* (2006.01)
*G06F 16/00* (2019.01)
(Continued)

(52) U.S. Cl.
CPC .......... *G06F 3/0647* (2013.01); *G06F 3/0604* (2013.01); *G06F 3/067* (2013.01);
(Continued)

(58) Field of Classification Search
CPC ...... G06F 3/0647; G06F 16/00; G06F 3/0604; G06F 3/0667; G06F 3/067;
(Continued)

(56) References Cited

U.S. PATENT DOCUMENTS

| 8,589,391 B1 | 11/2013 | Reynar et al. |
| 9,553,838 B1 * | 1/2017 | Panchenko ......... H04L 12/1859 |

(Continued)

FOREIGN PATENT DOCUMENTS

| CN | 103177042 A | 6/2013 |
| CN | 103916373 A | 7/2014 |

(Continued)

OTHER PUBLICATIONS

J. Preden, J. Kaugerand, E. Suurjaak, S. Astapov, L. Motus and R. Pahtma, "Data to decision: pushing situational information needs to the edge of the network," 2015 IEEE International Multi-Disciplinary Conference on Cognitive Methods in Situation Awareness and Decision, Orlando, FL, 2015, pp. 158-164.*

(Continued)

*Primary Examiner* — Pierre Miche Bataille
(74) *Attorney, Agent, or Firm* — Anova Law Group, PLLC

(57) ABSTRACT

The present disclosure discloses a data push method and device, a storage medium, and an electronic device. The method includes: acquiring to-be-pushed data and identifier information of the to-be-pushed data, the identifier information of the to-be-pushed data uniquely identifies the to-be-pushed data; and pushing the to-be-pushed data if indication information is not stored at a target storage location in a storage space, the target storage location comprising a storage location corresponding to the identifier information of the to-be-pushed data, and the indication information indicating identifier information of data that had been pushed.

15 Claims, 6 Drawing Sheets

(51) Int. Cl.
  *H04L 29/08* (2006.01)
  *G06F 12/1018* (2016.01)
  *G06F 12/122* (2016.01)
(52) U.S. Cl.
  CPC ........ *G06F 3/0667* (2013.01); *G06F 12/1018* (2013.01); *G06F 12/122* (2013.01); *G06F 16/00* (2019.01); *H04L 67/1097* (2013.01); *H04L 67/26* (2013.01)
(58) Field of Classification Search
  CPC .............. G06F 12/1018; G06F 12/122; H04L 67/1097; H04L 67/26
  See application file for complete search history.

(56) References Cited

U.S. PATENT DOCUMENTS

| | | | |
|---|---|---|---|
| 2004/0003351 | A1 | 1/2004 | Sommerer et al. |
| 2011/0250909 | A1* | 10/2011 | Mathias ............... H04M 7/0057 455/466 |
| 2011/0252146 | A1* | 10/2011 | Santamaria ............. H04L 51/34 709/227 |
| 2014/0136568 | A1 | 5/2014 | Surya |
| 2014/0136569 | A1 | 5/2014 | Miller et al. |
| 2015/0019676 | A1* | 1/2015 | Fablet ................. G06F 16/9574 709/213 |
| 2015/0212944 | A1* | 7/2015 | Chen ................... G06F 12/0862 711/137 |
| 2015/0249719 | A1* | 9/2015 | Wen .................... G06F 16/2255 709/217 |
| 2016/0105521 | A1* | 4/2016 | Wang ................. H04L 12/1859 709/206 |
| 2016/0105522 | A1* | 4/2016 | Somani ................ H04L 67/025 709/219 |
| 2016/0164950 | A1* | 6/2016 | Hurley ................ H04L 67/2814 709/219 |
| 2016/0337290 | A1* | 11/2016 | Li ......................... H04W 12/02 |
| 2018/0013845 | A1* | 1/2018 | Denoual .................. H04L 67/42 |
| 2018/0338012 | A1* | 11/2018 | Somani ............... H04L 67/1034 |
| 2019/0166216 | A1* | 5/2019 | Chen .................... H04L 67/325 |

FOREIGN PATENT DOCUMENTS

| | | |
|---|---|---|
| CN | 104104707 A | 10/2014 |
| CN | 104244032 A | 12/2014 |
| CN | 105824920 A | 8/2016 |
| CN | 106210127 A | 12/2016 |
| CN | 106326431 A | 1/2017 |
| CN | 106411975 A | 2/2017 |

OTHER PUBLICATIONS

V. Kanitkar and A. Delis, "Real-time client-server push strategies: specification and evaluation," Proceedings. Fourth IEEE Real-Time Technology and Applications Symposium (Cat. No. 98TB100245), Denver, CO, USA, 1998, pp. 179-188.*

N. E. Taylor and Z. G. Ives, "Reliable storage and querying for collaborative data sharing systems," 2010 IEEE 26th International Conference on Data Engineering (ICDE 2010), Long Beach, CA, 2010, pp. 40-51, doi: 10.1109/ICDE.2010.5447876.*

S. Sundareswaran, A. Squicciarini and D. Lin, "Ensuring Distributed Accountability for Data Sharing in the Cloud," in IEEE Transactions on Dependable and Secure Computing, vol. 9, No. 4, pp. 556-568, Jul.-Aug. 2012, doi: 10.1109/TDSC.2012.26.*

N. Kuntze and A. U. Schmidt, "Trustworthy Content Push," 2007 IEEE Wireless Communications and Networking Conference, Kowloon, 2007, pp. 2909-2912, doi: 10.1109/WCNC.2007.539.*

Wenting Tang and M. W. Mutka, "Intelligent browser initiated server pushing," Conference Proceedings of the 2000 IEEE International Performance, Computing, and Communications Conference (Cat. No. 00CH37086), Phoenix, AZ, USA, 2000, pp. 17-23, doi: 10.1109/PCCC.2000.830296.*

The World Intellectual Property Organization (WIPO) International Search Report for PCT/CN2018/075778 dated Apr. 27, 2018 5 Pages (including translation).

The State Intellectual Property Office of the People's Republic of China (SIPO) Office Action 1 for 201710109224.X dated Apr. 8, 2020 7 Pages (including translation).

* cited by examiner

DATA PUSH METHOD AND DEVICE, STORAGE MEDIUM, AND ELECTRONIC DEVICE

RELATED APPLICATIONS

This application claims priority to PCT Application No. PCT/CN2018/075778, filed on Feb. 8, 2018, which in turn claims priority of Chinese Patent Application No. 201710109224.X, filed with the Chinese Patent Office on Feb. 27, 2017 and entitled "DATA PUSH METHOD AND DEVICE". The two applications are incorporated by reference in their entirety.

FIELD OF TECHNOLOGY

The present disclosure relates to the computer field, and specifically, to a data push method and device, a storage medium, and an electronic device.

BACKGROUND OF THE DISCLOSURE

Identifier information (docId) of articles is cached directly in existing solutions for storing data push history. Internet users have increasingly demanded for latest feeds in this era of information explosion. Data push applications attract users by the important factors of efficiency and real-time performance of pushing relevant data to the users. The retention rate of users decreases if users keep seeing same feeds repetitively when refreshing data or failing to refresh data. Therefore, when data is pushed to users, efficient filtering of historical pushed data is critical to retention of users.

SUMMARY

Embodiments of the present disclosure provide a data push method and device, a storage medium, and an electronic device, to at least resolve the technical problem of excessively high storage costs of pushed data in the related technology.

According to an aspect of the embodiments of the present disclosure, a data push method is provided. The method includes: acquiring to-be-pushed data and identifier information of the to-be-pushed data, the identifier information of the to-be-pushed data uniquely identifies the to-be-pushed data; and pushing the to-be-pushed data if indication information is not stored at a target storage location in a storage space, the target storage location comprising a storage location corresponding to the identifier information of the to-be-pushed data, and the indication information being used for indicating identifier information of data that had been pushed.

According to another aspect of the embodiments of the present disclosure, a data push device is further provided. The device comprises one or more processors and one or more memories for storing computer program instructions, the computer program instructions being executed by the processor, and the computer program instructions comprising: an acquisition module, configured to acquire to-be-pushed data and identifier information of the to-be-pushed data, the identifier information of the to-be-pushed data uniquely identifying the to-be-pushed data; and a push module, configured to push the to-be-pushed data if indication information is not stored at a target storage location in a storage space, the target storage location comprising a storage location corresponding to the identifier information of the to-be-pushed data, and the indication information being used for indicating identifier information of data that has been pushed.

According to another aspect of the embodiments of the present disclosure, an electrical device is further provided. The electronic device comprises a memory and a processor, the memory storing a computer program, and the processor being configured to perform, by using the computer program, a data push method. The method comprises acquiring to-be-pushed data and identifier information of the to-be-pushed data, the identifier information of the to-be-pushed data uniquely identifies the to-be-pushed data; and pushing the to-be-pushed data if indication information is not stored at a target storage location in a storage space, the target storage location comprising a storage location corresponding to the identifier information of the to-be-pushed data, and the indication information being used for indicating identifier information of data that had been pushed.

In the embodiments of the present disclosure, to-be-pushed data and identifier information of the to-be-pushed data are acquired, where the identifier information of the to-be-pushed data is used for uniquely identifying the to-be-pushed data. The to-be-pushed data is pushed if predetermined indication information is not stored at a target storage location in a preset storage space, where the target storage location includes a storage location corresponding to the identifier information of the to-be-pushed data, and the predetermined indication information is used for indicating identifier information of pushed data. That is, only the predetermined indication information used for indicating identifier information of pushed data is stored at the storage location in the preset storage space. It indicates that the to-be-pushed data has not been pushed if the predetermined indication information is not stored at the target storage location in the preset storage space, and the to-be-pushed data is pushed. Accordingly, whether the predetermined indication information is stored at the target storage location corresponding to the identifier information of the to-be-pushed data is used to indicate whether the to-be-pushed data is pushed data, thereby reducing storage costs of pushed data, and overcoming the problem of excessively high storage costs of pushed data in the related technology.

BRIEF DESCRIPTION OF THE DRAWINGS

The accompanying drawings shown herein are provided for further understanding of the present disclosure, and constitute a part of this application, and the exemplary embodiments of the present disclosure and its description are used for explaining the present disclosure, but do not constitute improper limitations to the present disclosure. In the accompanying drawings.

DESCRIPTION OF EMBODIMENTS

To make the solutions of the present disclosure more comprehensible to a person skilled in the art, the following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

It should be noted that the terms "first" and "second" in the specification, the claims, and the accompanying drawings of the present disclosure are used only to differentiate similar objects, and do not describe a specific relationship or sequence therebetween. It is to be understood that the terms so used are interchangeable under appropriate circumstances such that the embodiments of the present disclosure described herein can be implemented in sequences other than those illustrated or otherwise described herein. Moreover, the terms "include", "comprise", and any variants thereof are intended to cover a non-exclusive inclusion, such that a process, method, system, product, or device that includes a series of steps or units is not necessarily limited to those steps and units expressly listed, but may include other steps or units not expressly listed or inherent to such process, method, product, or device.

Figure 1:
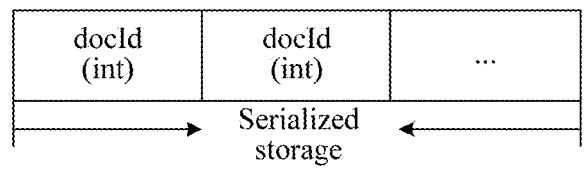
FIG. 1 is a schematic diagram of storing historical push data according to the related technology.

Often, docId of an article is cached directly in a solution for storing historical push data. FIG. 1 is a schematic diagram of storing historical push data according to the related technology. As shown in FIG. 1, identifier information (docId) of historical push data is stored in a cache region. Undesirable experience may occur when data (for example, feeds) has excessively large quantities of users and refreshes. For example, an article is pushed repeatedly, or data fails to be refreshed. As a result, feeds cannot be infinitely refreshed. The main reason is as follows: Identifier information (docId) of articles is cached directly in the existing solution for storing historical push data. When a quantity of refreshes of users is excessively large, storage space is excessively consumed to cause a rapid increase in storage costs. In such scenarios, storage overflows, old data push records are eliminated, and many repetitive articles are recommended consequently. In addition, historical data push records of users are stored at a remote cache service node. When there is a large amount of storage, a remotely read single historical record may be excessively large to cause a network timeout. As a result, a historical data push record cannot be returned, and no recommended data of feeds is returned.

Figure 2:
FIG. 2 is a schematic diagram of an application environment of a data push method according to an embodiment of the present disclosure.

In an embodiment of the present disclosure, an embodiment of the foregoing data push method is provided. In one implementation, the data push method may be applied to an application environment shown in FIG. 2, but the present disclosure is not limited to the application environment. A terminal 202 is connected to a server 204 through a network 206. The terminal 202 is configured to send a data push request to the server 204. The data push request is used for requesting the server 204 to push data to the terminal 202. The terminal 202 acquires, from the server 204 via the network 206, the data pushed by the server 204. The server 204 is configured to: acquire to-be-pushed data and identifier information of the to-be-pushed data in response to the data push request sent by the terminal 202, and push the to-be-pushed data if predetermined indication information is not stored at a target storage location in a preset storage space, where the identifier information of the to-be-pushed data is used for uniquely identifying the to-be-pushed data, the target storage location includes a storage location corresponding to the identifier information of the to-be-pushed data, and the predetermined indication information is used for indicating identifier information of pushed data.

In some embodiments, only the predetermined indication information used for indicating identifier information of pushed data is stored at the storage location in the preset storage space on the server 204. It indicates that the to-be-pushed data has not been pushed if the predetermined indication information is not stored at the target storage location in the preset storage space, and the to-be-pushed data is pushed. Accordingly, whether the predetermined indication information is stored at the target storage location corresponding to the identifier information of the to-be-pushed data is used to indicate whether the to-be-pushed data is pushed data, thereby reducing storage costs of pushed data, and overcoming the problem of excessively high storage costs of pushed data in the related technology.

In some embodiments of the present disclosure, the terminal may include, but is not limited to, at least one of the following: a mobile phone, a tablet computer, a notebook computer, a desktop PC, a digital television, and another hardware device that performs regional sharing. The network may include, but is not limited to, at least one of the following: a wide area network, a metropolitan area network, and a local area network. The foregoing is only an example, and this embodiment is not limited thereto.

In some embodiments of the present disclosure, the server 204 is configured to: retrieve first mapping information from the identifier information of the to-be-pushed data, where the first mapping information is used for indicating the storage location corresponding to the identifier information of the to-be-pushed data; and push the to-be-pushed data if the predetermined indication information is not stored at the storage location that is in the preset storage space and is indicated by the first mapping information.

In some embodiments of the present disclosure, the server 204 is configured to: retrieve a first hash value set corresponding to the identifier information of the to-be-pushed data, where the first hash value set includes a first preset quantity of hash values, and each of the first preset quantity of hash values corresponds to one storage location in the target storage location; and push the to-be-pushed data if the first preset value is not stored at the storage location indicated by each hash value in the first hash value set.

In some embodiments of the present disclosure, the server 204 is configured to: traverse one or more first preset storage blocks according to storage time recorded in the one or more first preset storage blocks, where the preset storage space includes the one or more first preset storage blocks; and push the to-be-pushed data if none of the one or more first preset storage blocks has the predetermined indication information stored at the target storage location.

In some embodiments of the present disclosure, the server 204 is configured to update the preset storage space according to the identifier information of the to-be-pushed data.

In some embodiments of the present disclosure, the server 204 is configured to: retrieve second mapping information from the identifier information of the to-be-pushed data, where the second mapping information is used for indicating the storage location corresponding to the identifier information of the to-be-pushed data; set a value stored at the storage location that is in the preset storage space and is indicated by the second mapping information to a second preset value; and store push time of the to-be-pushed data at a first preset storage location of the preset storage space, and add 1 to a value stored at a second preset storage location, where the second preset storage location is used for storing an amount of pushed historical data recorded in the preset storage space.

In some embodiments of the present disclosure, the server 204 is configured to: acquire a second hash value set corresponding to the identifier information of the to-be-pushed data, where the second hash value set includes a second preset quantity of hash values, and each of the second preset quantity of hash values corresponds to a storage location in the preset storage space; and set the value stored at the storage location indicated by each hash value in the second hash value set to the second preset value.

In some embodiments of the present disclosure, the server 204 is configured to: set the value stored at the storage location indicated by the second mapping information in one of the one or more first preset storage blocks that records storage time closest to current time to the second preset value if the value stored at the second preset storage location in the one of the one or more first preset storage blocks that records the storage time closest to the current time does not reach a first preset threshold, where the preset storage space includes the one or more first preset storage blocks.

In some embodiments of the present disclosure, the server 204 is further configured to: allocate a second preset storage block in the preset storage space if the value stored at the second preset storage location in the one of the one or more first preset storage blocks that records the storage time closest to the current time reaches the first preset threshold; and set the value stored at the storage location that is in the second preset storage block and is indicated by the second mapping information to the second preset value.

In some embodiments of the present disclosure, the server 204 is further configured to: release storage space in one of the one or more first preset storage blocks that records storage time having a maximum difference value from the current time if a quantity of the one or more first preset storage blocks reaches a second preset threshold.

In some embodiments of the present disclosure, the server 204 is further configured to: traverse the one or more first preset storage blocks according to storage time recorded in the one or more first preset storage blocks, where the preset storage space includes the one or more first preset storage blocks; and release one of the one or more first preset storage spaces that records storage time earlier than preset time.

Figure 3:
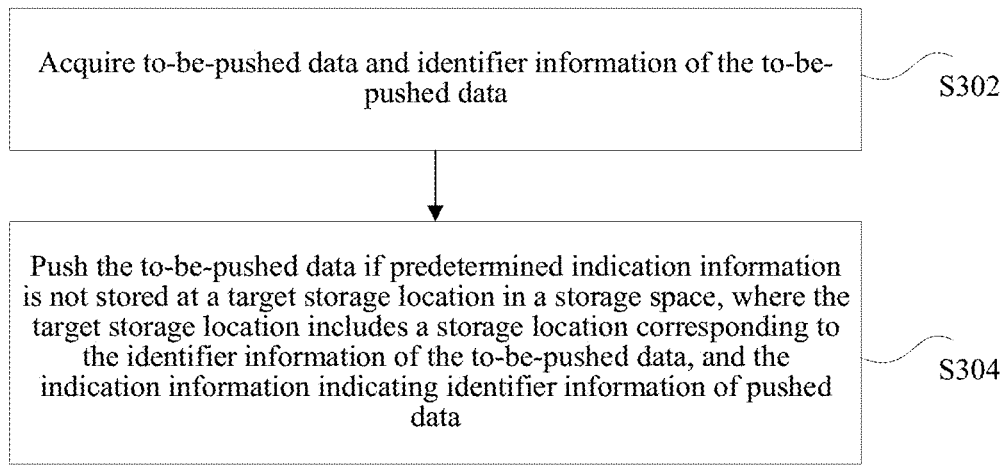
FIG. 3 is a schematic diagram of a data push method according to an embodiment of the present disclosure.

According to an embodiment of the present disclosure, a data push method is provided. As shown in FIG. 3, the method includes:

S302: Acquire to-be-pushed data and identifier information of the to-be-pushed data, where the identifier information of the to-be-pushed data is used for uniquely identifying the to-be-pushed data.

S304: Push the to-be-pushed data if predetermined indication information is not stored at a target storage location in a preset storage space, where the target storage location includes a storage location corresponding to the identifier information of the to-be-pushed data, and the predetermined indication information is used for indicating identifier information of pushed data.

In some embodiments of the present disclosure, the data push method may be applied to a scenario in which a server pushes data to a client, but this embodiment is not limited to the scenario. The client may be, but is not limited to, various types of software such as utility software (for example, a browser, weather software or calendar software), news reading software, instant messaging software, community software, and gaming software. In some embodiments, the data push method may be applied to a scenario in which feed information is refreshed in the browser or a scenario in which news is pushed in the news reading software to push data effectively, but this embodiment is not limited to these scenarios. The foregoing is only an example, and this embodiment is not limited thereto.

In some embodiments of the present disclosure, the preset storage space may be designed into a bloom filter form. For example, in one implementation, each of non-negative integers 0 to N corresponds to a storage location in a bloom filter, and k hash values are chosen for identifier information of pushed data, where k is a positive integer. Storage locations that correspond to the k hash values respectively are found in the bloom filter, and bit values stored at the found storage locations are set to the predetermined indication information (for example, set to 1). When to-be-pushed data and identifier information of the to-be-pushed data are acquired, k hash values are chosen for the identifier information of the to-be-pushed data. Storage locations indicated by the k hash values corresponding to the identifier information of the to-be-pushed data are found from the preset storage space, and the storage locations are target storage locations. If a bit value stored at each found target storage location is the predetermined indication information, it indicates that the to-be-pushed data has been pushed. In this case, the to-be-pushed data is filtered out instead of being pushed. If all bit values stored at the found target storage locations are not the predetermined indication information, it indicates that the to-be-pushed data has not been pushed. In this case, the to-be-pushed data is pushed.

In some embodiments of the present disclosure, the predetermined indication information is used for indicating identifier information of pushed data. A form of the predetermined indication information may be, but is not limited to, a predetermined value (for example, set to 1), a predetermined label, or information (for example, a value that increments sequentially) that satisfies a predetermined rule. It should be noted that the form of the predetermined indication information is only an example in this embodiment, the predetermined indication information may be in any form, and the form is not limited in this embodiment.

In some embodiments of the present disclosure, the acquired to-be-pushed data is not pushed if the predetermined indication information is stored at the target storage location in the preset storage space. In this case, the to-be-pushed data may be deleted from a pool of to-be-pushed data. Alternatively, a specified label may be added to the to-be-pushed data, where the specified label is used for indicating that the data has been pushed and should not be pushed any longer. This embodiment is not limited thereto.

It may be learned that by using the foregoing steps, only the predetermined indication information used for indicating identifier information of pushed data is stored at the storage location in the preset storage space. It indicates that the to-be-pushed data has not been pushed if the predetermined indication information is not stored at the target storage location in the preset storage space, and the to-be-pushed data is pushed. Accordingly, whether the predetermined indication information is stored at the target storage location corresponding to the identifier information of the to-be-pushed data is used to indicate whether the to-be-pushed data is pushed data, thereby reducing storage costs of pushed data, and overcoming the problem of excessively high storage costs of pushed data in the related technology.

Further, when only the predetermined indication information used for indicating identifier information of pushed data is stored in the preset storage space, stored information in the preset storage space can be reduced effectively, so that storage costs of pushed data are reduced and more pushed data can be stored in a same amount of preset storage space. Accordingly, storage is prevented from overflowing, an old data push record result is not eliminated, and a large amount of repetitive data is prevented from being recommended, so that data is recommended without repetition and costs are reduced.

In addition, when a large amount of pushed data is stored, a remotely read single historical record may be excessively large to cause a network timeout. Consequently, a historical data push record cannot be returned, and no pushed data is returned. As a result, data cannot be pushed, and feeds cannot be refreshed. When only the predetermined indication information used for indicating identifier information of pushed data is stored in the preset storage space, stored information in the preset storage space is reduced effectively. Accordingly, storage costs of pushed data are reduced, and a read historical record has a smaller amount of data, so that data is refreshed without failing, and recommended data is refreshed infinitely.

In some embodiments of the present disclosure, the pushing the to-be-pushed data if predetermined indication information is not stored at a target storage location in a preset storage space includes:

S1: Retrieve first mapping information from the identifier information of the to-be-pushed data, where the first mapping information is used for indicating the storage location corresponding to the identifier information of the to-be-pushed data.

S2: Push the to-be-pushed data if the predetermined indication information is not stored at the storage location that is in the preset storage space and is indicated by the first mapping information.

In some embodiments of the present disclosure, a manner of retrieving the first mapping information from the identifier information of the to-be-pushed data may be, but is not limited to, acquiring a hash value of the identifier information of the to-be-pushed data, where the retrieved hash value may be a hash value set that includes a plurality of hash values. For example, a first hash value set that corresponds to the identifier information of the to-be-pushed data and includes a first preset quantity of hash values is retrieved, where each of the first preset quantity of hash values corresponds to one storage location in the target storage location. Accordingly, whether the first preset value is stored at the storage location indicated by each hash value in the first hash value set may be used to indicate whether the predetermined indication information is stored at the storage location that is in the preset storage space and is indicated by the first mapping information, and the to-be-pushed data is pushed if the first preset value is not stored at the storage location indicated by each hash value in the first hash value set.

In some embodiments of the present disclosure, the pushing the to-be-pushed data if predetermined indication information is not stored at a target storage location in a preset storage space includes:

S1: Traverse one or more first preset storage blocks according to storage time recorded in the one or more first preset storage blocks, where the preset storage space includes the one or more first preset storage blocks.

S2: Push the to-be-pushed data if none of the one or more first preset storage blocks has the predetermined indication information stored at the target storage location.

In some embodiments of the present disclosure, an order of traversing the first preset storage blocks according to storage time may be preset. Traversal may start from a first preset storage block (that is, a first preset storage block having latest storage time), or traversal may start from a last first preset storage block (that is, a first preset storage block having earliest storage time).

In one implementation, the preset storage space may be designed into a DBF, but is not limited thereto. The DBF is used to query whether the to-be-pushed data is pushed data. That is, the DBF is used to filter data push history, and k values may be chosen for the identifier information of the to-be-pushed data (for example, docId of an article that needs to be recommended and exposed) in a same manner of choosing hash values during storage. A last first preset storage block (BF) storage region usually stores latest recommended data, and traversal may start from the last BF storage region, so that traversal and query efficiency can be improved. During query, if corresponding bits of all hash values in a same BF are 1, it indicates that the article has been exposed, and the article does not need to be exposed repetitively a current time and needs to be filtered out. If corresponding bits of all hash values in a same BF are not 1, a previous block continues to be queried.

Figure 4:
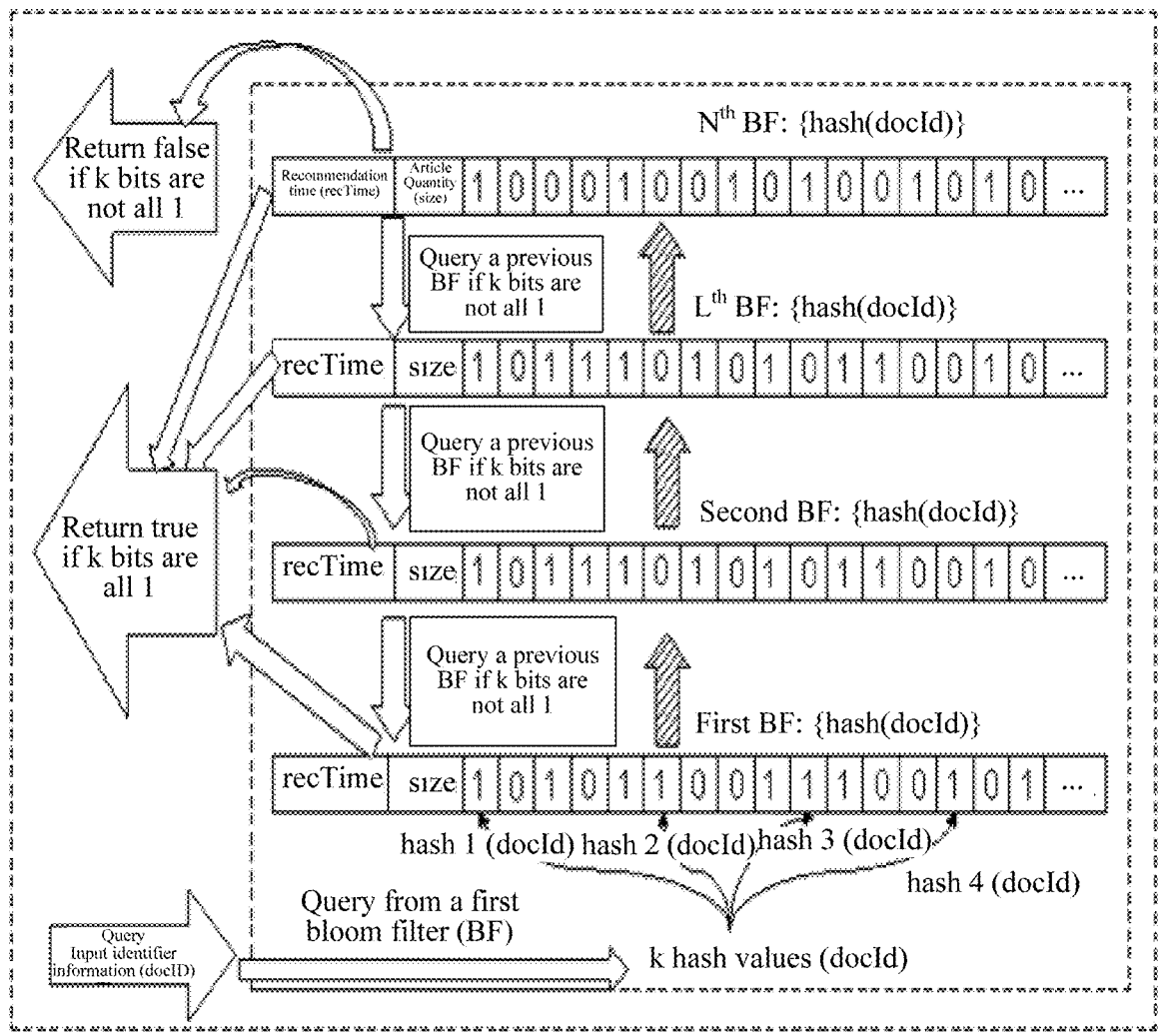
FIG. 4 is a schematic diagram of a method for searching for pushed data by using a dynamic bloom filter (DBF) according to an embodiment of the present disclosure.

FIG. 4 is a schematic diagram of a method for searching for pushed data by using a DBF according to an embodiment of the present disclosure. As shown in FIG. 4, k hash values are chosen for docId of a feed article, and traversal starts from a last BF and ends at a first BF, or traversal starts from a first BF and ends at a last BF. If a block in the middle satisfies that all k corresponding bits are 1, it indicates that the article hits a historical data push record, that is, the article is pushed data and needs to be filtered out. If there is no hit after all blocks have been traversed, it indicates that the article is not in a historical data push record and can be pushed to a user.

It may be learned that by using the foregoing steps, the preset storage space is allocated as one or more first preset storage blocks, so that pushed data can be managed separately, thereby improving data management efficiency.

In some embodiments of the present disclosure, after the pushing the to-be-pushed data, the method further includes:

S1: Update the preset storage space according to the identifier information of the to-be-pushed data.

In some embodiments of the present disclosure, if the to-be-pushed data is pushed, it indicates that the to-be-pushed data becomes pushed data during data push a next time. A push historical record of the to-be-pushed data may be recorded in the preset storage space, so that the preset storage space is updated, thereby ensuring real-time performance of pushed data.

In some embodiments of the present disclosure, the following manner may be used to update the preset storage space: retrieving, from the identifier information of the to-be-pushed data, second mapping information used for indicating the storage location corresponding to the identifier information of the to-be-pushed data, and setting a value stored at the storage location that is in the preset storage space and is indicated by the second mapping information to a second preset value; and storing push time of the to-be-pushed data at a first preset storage location of the preset storage space, and adding 1 to a value stored at a second preset storage location, where the second preset storage location is used for storing an amount of pushed historical data recorded in the preset storage space. This embodiment is not limited to this manner.

In some embodiments of the present disclosure, a second preset quantity of hash values corresponding to the identifier information of the to-be-pushed data may form the second hash value set, the second hash value set is used as the second mapping information retrieved from the identifier information of the to-be-pushed data, and information about the second hash value set is recorded in the preset storage space. For example, a second hash value set corresponding to the identifier information of the to-be-pushed data is acquired, where the second hash value set includes the second preset quantity of hash values, and each of the second preset quantity of hash values corresponds to a storage location in the preset storage space, and the value stored at the storage location indicated by each hash value in the second hash value set is set to the second preset value.

In one implementation, when pushed data (for example, an exposed article of a feed) is stored, according to a size of designed bloom filter bits, a plurality of hash values is chosen for docId of the article. Each hash value is mapped to a corresponding bloom filter bit, where the bloom filter bit is set to 1. A current timestamp (that is, storage time of the pushed data) and an accumulated storage quantity of articles are stored. For the design of a length space of bloom filter bits, a refresh quantity distribution of feeds refreshed by users is obtained by collecting statistics of a large amount of data, and a threshold is chosen according to refresh quantity distribution as a size of a bloom filter storage block, so that a storage space having relatively high use efficiency can be allocated.

In some embodiments of the present disclosure, the preset storage space may be divided into one or more first preset storage blocks. Information about data that has been pushed is stored at a storage location corresponding to the second mapping information in one first preset storage block that records storage time closest to current time. When the to-be-pushed data is stored, a storage upper limit may be set for an amount of pushed data that each first preset storage block stores. If an amount of pushed data stored in a current first preset storage block does not reach the upper limit, the information about the to-be-pushed data is stored in the current first preset storage block. For example, the value stored at the storage location indicated by the second mapping information in one of the one or more first preset storage blocks that records storage time closest to the current time is set to the second preset value if the value stored at the second preset storage location in the one of the one or more first preset storage blocks that records the storage time closest to the current time does not reach a first preset threshold, where the preset storage space includes the one or more first preset storage blocks.

In some embodiments of the present disclosure, if the amount of pushed data stored in the current first preset storage block already reaches the storage upper limit of the current first preset storage block, a second preset storage block is allocated in the preset storage space, and the information about the to-be-pushed data is stored in the newly allocated second preset storage block. For example, if the value stored at the second preset storage location reaches the first preset threshold, a second preset storage block in the preset storage space is allocated, and the value stored at the storage location that is in the second preset storage block and is indicated by the second mapping information is set to the second preset value.

In one implementation, dynamic capacity expansion of a bloom filter may be used when a quantity of exposed articles of a user exceeds a quantity of articles that the bloom filter can store. During automatic capacity expansion, one storage block is added to continue to store data. In addition, to avoid crawling of a crawler, a capacity expansion upper limit of a storage block quantity of a bloom filter may be set. Most users cannot reach this upper limit.

Figure 5:
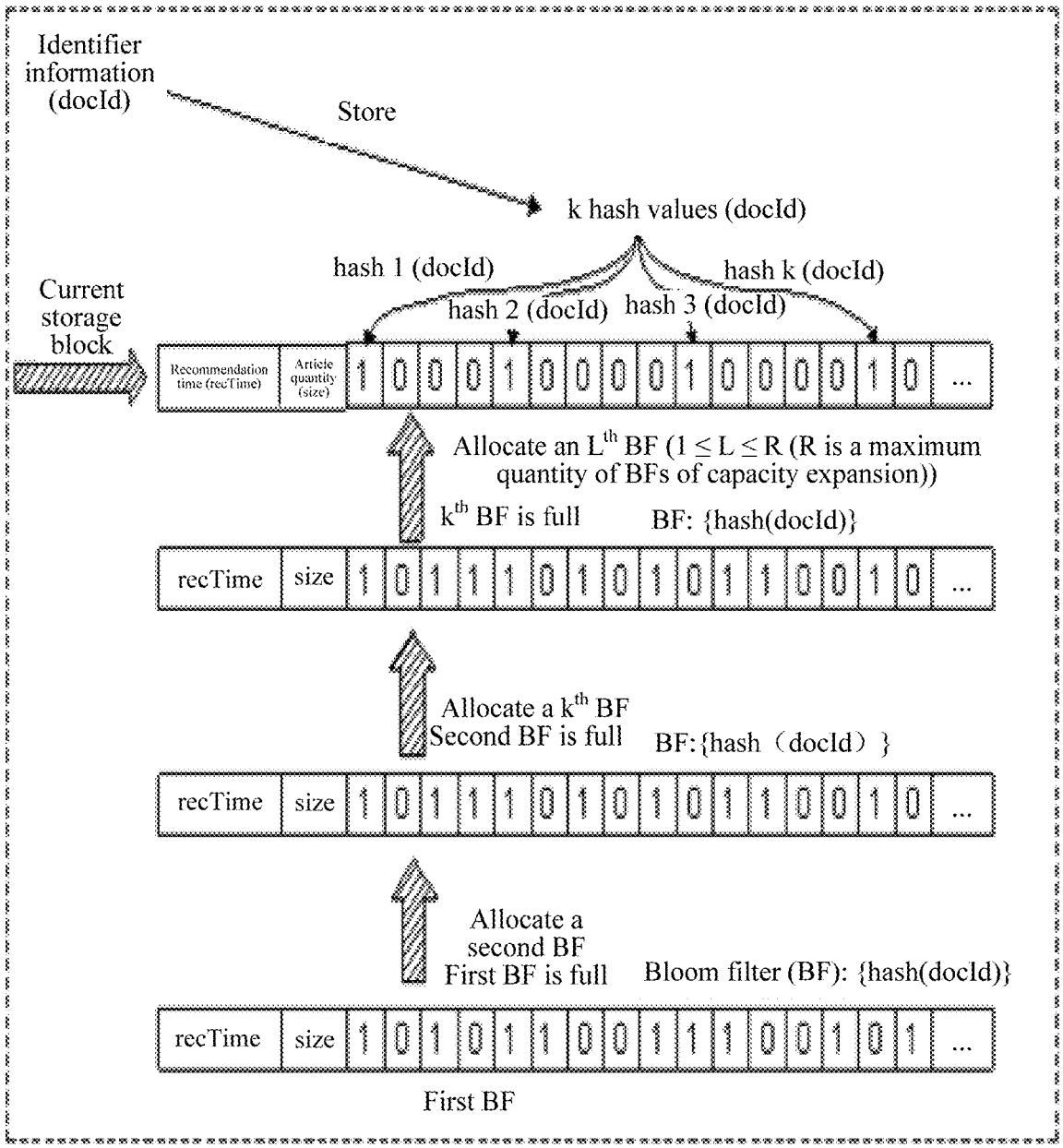
FIG. 5 is a schematic diagram of a capacity expansion method for a DBF according to an embodiment of the present disclosure.

FIG. 5 is a schematic diagram of a capacity expansion method for a DBF according to an embodiment of the present disclosure. As shown in FIG. 5, a DBF includes a plurality of BFs. A header of each BF includes a recommendation time (recTime, equivalent to storage time stored at the first preset storage location) and a quantity (size, equivalent to the value stored at the second preset storage location) of articles. When an article is stored, it is determined that whether a quantity of current storage blocks reaches a restricted storage quantity. If the restricted storage quantity is reached and the quantity of blocks is less than a restricted block quantity upper limit R, a new BF is allocated again. For docId of the article, k hash values are chosen, and bits corresponding to the k hash values in current BFs are set to 1. A capacity expansion method for a DBF may include the following steps:

Step 1: Determine whether a storage quantity of current storage blocks is reached, and choose k hash values for docId of an article and store information corresponding to the k hash values in current BFs if the storage quantity is not reached, where bits corresponding to the k hash values in the BFs may be set to 1.

Step 2: Determine whether a quantity of BFs in a current DBF reaches the upper limit, and release a first BF if the storage quantity of the current storage blocks is reached.

Step 3: Continue to allocate a BF if the quantity of current BFs does not reach the upper limit, and store the docId of the article.

In some embodiments of the present disclosure, if a current storage space of the preset storage space has reached a maximum value, a storage space of the first preset storage block that is stored earliest may be released. For example, storage space in one of the one or more first preset storage blocks that records storage time having a maximum difference value from the current time is released if a quantity of the one or more first preset storage blocks reaches a second preset threshold before the second preset storage block in the preset storage space is allocated.

In some embodiments of the present disclosure, the method further includes:

S1: Traverse one or more first preset storage blocks according to storage time recorded in the one or more first preset storage blocks, where the preset storage space includes the one or more first preset storage blocks.

S2: Release one of the one or more first preset storage spaces that records storage time earlier than preset time.

In some embodiments of the present disclosure, for a preset storage block having storage duration exceeding particular duration, a storage space of the preset storage block that expires may be released periodically, thereby improving the utilization of the preset storage space.

In one implementation, when duration of some blocks in the DBF has exceeded a preset time period, such data becomes useless in the storage space, and it may be chosen to eliminate and release the data. The first BF in the DBF has the longest storage duration, and sequential traversal may start from the first block start for elimination. Because the duration of the blocks in the DBF increases sequentially, when a block does not satisfy elimination duration, the traversal may be terminated. If the quantity of BFs in the DBF has reached the upper limit during capacity expansion, the first BF having the longest storage duration is eliminated first, and one block is eliminated each time. Accordingly, repetitive recommendation does not occur within a particular range.

Figure 6:
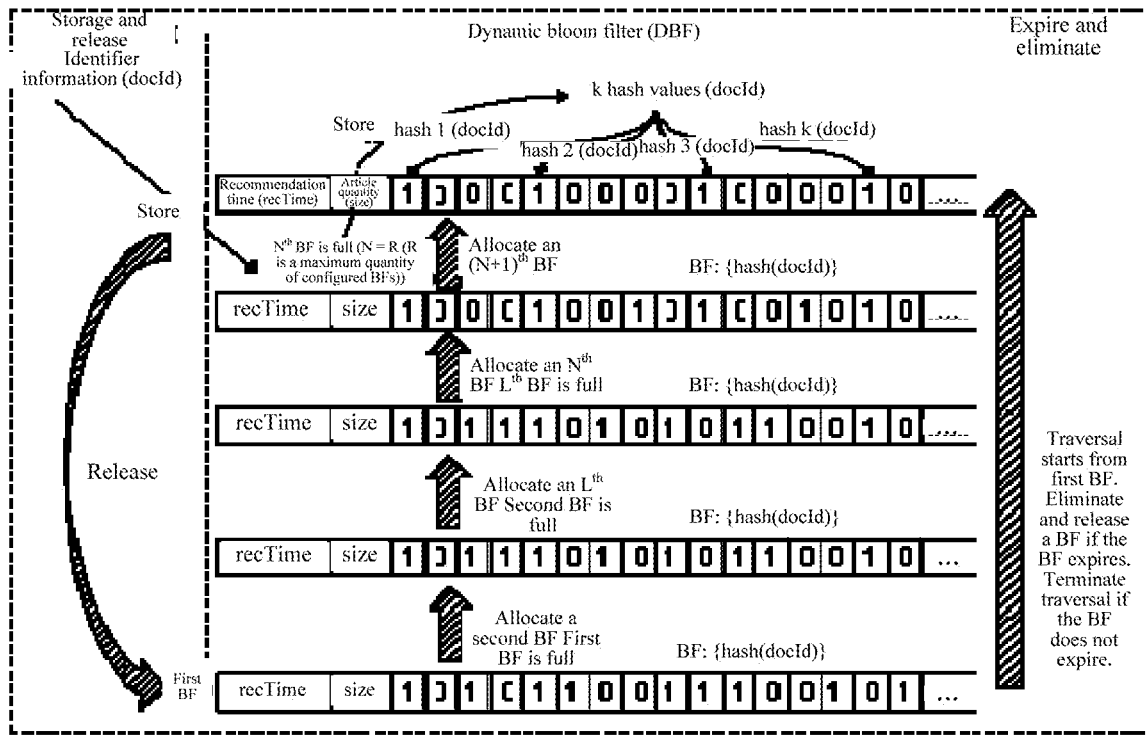
FIG. 6 is a schematic diagram of a release method for a DBF according to an embodiment of the present disclosure.

FIG. 6 is a schematic diagram of a release method for a DBF according to an embodiment of the present disclosure. As shown in FIG. 6, recTime of each BF in a DBF represents recommendation duration that is stored latest. When a historical data push record stored in the DBF is read, traversal starts from the first block. When recTime of a BF exceeds preset duration, the BF may be released. During storage, if a quantity of allocated BFs reaches a restricted upper limit, a BF having longest recTime may be released, and a new BF is allocated.

In an example, the DBF may store a historical data push record with "loss." "Loss" means that some articles not in the historical data push record are mistakenly determined to be in a historical record due to the use of a hash manner. In this example, a historical data push record may be stored by controlling an acceptable mistaken determination rate. DBF-related parameters are calculated as follows: A BF storage space $$m = -\frac{n\ln p}{(\ln 2)^2}$$

of each bloom filter is calculated according to a total quantity n of articles stored in each BF and an acceptable mistaken determination rate p. A quantity of optimal hash functions is $$k = \frac{m}{n}\ln 2.$$

A mis taken determination rate of a BF is represented as $f^{BF}(m,k,n)=p$. A plurality of BFs is independent of each other. If a quantity of BFs allocated in capacity expansion is r, a mistaken determination rate of an element in r filled DBFs is $f^{DBF}(m,k,n,r)=1-(1-f^{BF}(m,k,n))^r$. An effective DBF may be designed by properly choosing $f^{DBF}$ to implement storage and query of feeds.

In some embodiments of the present disclosure, a solution of randomly selecting data may be designed to resolve a problem that data cannot be refreshed because a DBF record fails to be read. In the solution, a specified amount of data of feeds may be selected randomly and pushed to a user from a data pool starting from a specified numerical subscript. For the specified numerical subscript, an average record quantity is calculated according to a record quantity of feeds refreshed by the user and used as a subscript. Data after the subscript is used as a random start data pool, so that the user can obtain minimal repetitive content during refreshing.

In embodiments of the present disclosure, as compared with conventional solution, the solution using a DBF occupies a smaller storage space, reduces network time consumption, and has higher query efficiency.

An example provides a storage, capacity expansion, and release method of a DBF. The method includes the following steps:

Step 1: Read a historical data push record stored by a user, query whether there is an expired BF, and release the expired BF if there is one.

Step 2: Choose k different hash values for docId of an article.

Step 3: Determine whether a current BF is full, and perform capacity expansion and allocate a BF again if the current block is full.

Step 4: Map the k hash values to k bits in the current BF, and set corresponding bits to 1.

Step 5: Store a current write time (that is, storage time of currently stored to-be-pushed data), and accumulate a quantity of articles in the current BF.

It should be noted that the foregoing method embodiments are illustrated as a series of action combinations for ease of description; however, a person skilled in the art should know that the present disclosure is not limited to the described order of actions, because based on the present disclosure, some steps may be performed in another order or at the same time. Next, a person skilled in the art should know that the embodiments described in the specification are all optional embodiments, and the involved actions and modules are not necessarily required in the present disclosure.

Through the above description of the implementation, it is clear to a person skilled in the art that the methods in the foregoing embodiments may be accomplished through software plus a necessary universal hardware platform or through hardware. However, in most cases, the former one is a preferred implementation. Based on such understanding, the technical solutions of the present disclosure essentially or the part that contributes to the related technology may be embodied in the form of a software product. The computer software product may be stored in a storage medium (for example, a read-only memory (ROM)/random-access memory (RAM), a magnetic disk or an optical disc) and contain several instructions adapted to instruct computer equipment (for example, a mobile phone, a computer, a server, or network equipment) to perform the method according to the embodiments of the present disclosure.

Figure 7:
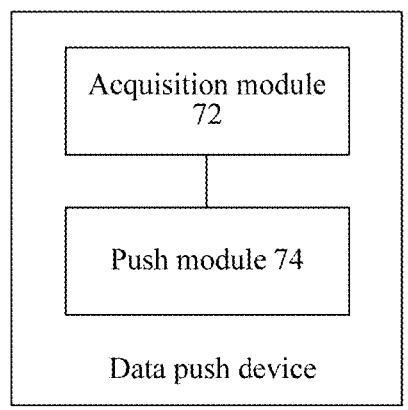
FIG. 7 is a schematic diagram of a data push device according to an embodiment of the present disclosure.

According to an embodiment of the present disclosure, a data push device configured to implement the foregoing data push method is further provided. As shown in FIG. 7, the device includes:

1) an acquisition module 72, configured to acquire to-be-pushed data and identifier information of the to-be-pushed data, where the identifier information of the to-be-pushed data is used for uniquely identifying the to-be-pushed data; and 2) a push module 74, configured to push the to-be-pushed data if predetermined indication information is not stored at a target storage location in a preset storage space, where the target storage location includes a storage location corresponding to the identifier information of the to-be-pushed data, and the predetermined indication information is used for indicating identifier information of pushed data.

In some embodiments of the present disclosure, the data push device may be applied to a scenario in which a server pushes data to a client, but this embodiment is not limited to the scenario. The client may be, but is not limited to, various types of software such as utility software (for example, a browser, weather software or calendar software), news reading software, instant messaging software, community software, and gaming software. In some embodiments, the data push device may be applied to a scenario in which feed information is refreshed in the browser or a scenario in which news is pushed in the news reading software to push data effectively, but this embodiment is not limited to these scenarios. The foregoing is only an example, and this embodiment is not limited thereto.

In some embodiments of the present disclosure, the preset storage space may be designed into a bloom filter form. For example, in an implementation, each of non-negative integers 0 to N corresponds to a storage location in a bloom filter, and k hash values are chosen for identifier information of pushed data, where k is a positive integer. Storage locations that correspond to the k hash values respectively are found in the bloom filter, and bit values stored at the found storage locations are set to the predetermined indication information (for example, set to 1). When to-be-pushed data and identifier information of the to-be-pushed data are acquired, k hash values are chosen for the identifier information of the to-be-pushed data. Storage locations indicated by the k hash values corresponding to the identifier information of the to-be-pushed data are found from the preset storage space, and the storage locations are target storage locations. If a bit value stored at each found target storage location is the predetermined indication information, it indicates that the to-be-pushed data has been pushed. In this case, the to-be-pushed data is filtered out instead of being pushed. If all bit values stored at the found target storage locations are not the predetermined indication information, it indicates that the to-be-pushed data has not been pushed. In this case, the to-be-pushed data is pushed.

In some embodiments of the present disclosure, the predetermined indication information is used for indicating identifier information of pushed data. A form of the predetermined indication information may be, but is not limited to, a predetermined value (for example, set to 1), a predetermined label, or information (for example, a value that increments sequentially) that satisfies a predetermined rule. It should be noted that the form of the predetermined indication information is only an example in this embodiment, the predetermined indication information may be in any form, and the form is not limited in this embodiment.

In some embodiments of the present disclosure, the acquired to-be-pushed data is not pushed if the predetermined indication information is stored at the target storage location in the preset storage space. In this case, the to-be-pushed data may be deleted from a pool of to-be-pushed data. Alternatively, a specified label may be added to the to-be-pushed data, where the specified label is used for indicating that the data has been pushed and should not be pushed any longer. This embodiment is not limited thereto.

It may be learned that by using the foregoing steps, only the predetermined indication information used for indicating identifier information of pushed data is stored at the storage location in the preset storage space. It indicates that the to-be-pushed data has not been pushed if the predetermined indication information is not stored at the target storage location in the preset storage space, and the to-be-pushed data is pushed. Accordingly, whether the predetermined indication information is stored at the target storage location corresponding to the identifier information of the to-be-pushed data is used to indicate whether the to-be-pushed data is pushed data, thereby reducing storage costs of pushed data, and overcoming the problem of excessively high storage costs of pushed data in the related technology.

Further, when only the predetermined indication information used for indicating identifier information of pushed data is stored in the preset storage space, stored information in the preset storage space can be reduced effectively, so that storage costs of pushed data are reduced and more pushed data can be stored in a same amount of preset storage space. Accordingly, storage is prevented from overflowing, an old data push record result is not eliminated, and a large amount of repetitive data is prevented from being recommended, so that data is recommended without repetition and costs are reduced.

In addition, when a large amount of pushed data is stored, a remotely read single historical record may be excessively large to cause a network timeout. Consequently, a historical data push record cannot be returned, and no pushed data is returned. As a result, data cannot be pushed, and feeds cannot be refreshed. When only the predetermined indication information used for indicating identifier information of pushed data is stored in the preset storage space, stored information in the preset storage space is reduced effectively. Accordingly, storage costs of pushed data are reduced, and a read historical record has a smaller amount of data, so that data is refreshed without failing, and recommended data is refreshed infinitely.

In some embodiments of the present disclosure, the push module 74 includes:

1) a first retrieval unit, configured to retrieve first mapping information from the identifier information of the to-be-pushed data, where the first mapping information is used for indicating the storage location corresponding to the identifier information of the to-be-pushed data; and 2) a first push unit, configured to push the to-be-pushed data if the predetermined indication information is not stored at the storage location that is in the preset storage space and is indicated by the first mapping information.

In some embodiments of the present disclosure, the first retrieval unit is configured to: retrieve a first hash value set corresponding to the identifier information of the to-be-pushed data, where the first hash value set includes a first preset quantity of hash values, and each of the first preset quantity of hash values corresponds to one storage location in the target storage location; and the first push unit is configured to: push the to-be-pushed data if the first preset value is not stored at the storage location indicated by each hash value in the first hash value set.

In some embodiments of the present disclosure, a manner in which the first retrieval unit retrieves the first mapping information from the identifier information of the to-be-pushed data may be, but is not limited to, acquiring a hash value of the identifier information of the to-be-pushed data, where the retrieved hash value may be a hash value set that includes a plurality of hash values.

In some embodiments of the present disclosure, the push module 74 includes:

1) a traversal unit, configured to traverse one or more first preset storage blocks according to storage time recorded in the one or more first preset storage blocks, where the preset storage space includes the one or more first preset storage blocks; and 2) a second push unit, configured to push the to-be-pushed data if none of the one or more first preset storage blocks has the predetermined indication information stored at the target storage location.

In some embodiments of the present disclosure, an order of traversing the first preset storage blocks according to storage time may be preset. Traversal may start from a first preset storage block (that is, a first preset storage block having latest storage time), or traversal may start from a last first preset storage block (that is, a first preset storage block having earliest storage time).

In one implementation, the preset storage space may be designed into a DBF, but is not limited thereto. The DBF is used to query whether the to-be-pushed data is pushed data. That is, the DBF is used to filter data push history, and k values may be chosen for the identifier information of the to-be-pushed data (for example, docId of an article that needs to be recommended and exposed) in a same manner of choosing hash values during storage. A last first preset storage block (BF) storage region usually stores latest recommended data, and traversal may start from the last BF storage region, so that traversal and query efficiency can be improved. During query, if corresponding bits of all hash values in a same BF are 1, it indicates that the article has been exposed, and the article does not need to be exposed repetitively a current time and needs to be filtered out. If corresponding bits of all hash values in a same BF are not 1, a previous block continues to be queried.

FIG. 4 is a schematic diagram of a method for searching for pushed data by using a DBF according to an embodiment of the present disclosure. As shown in FIG. 4, k hash values are chosen for docId of a feed article, and traversal starts from a last BF and ends at a first BF. If a block in the middle satisfies that all k corresponding bits are 1, it indicates that the article hits a historical data push record, that is, the article is pushed data and needs to be filtered out. If there is no hit after all blocks have been traversed, it indicates that the article is not in a historical data push record and can be pushed to a user.

It may be learned that by using the foregoing device, the preset storage space is allocated as one or more first preset storage blocks, so that pushed data can be managed separately, thereby improving data management efficiency.

In some embodiments of the present disclosure, the foregoing device further includes:

1) an update module, configured to update the preset storage space according to the identifier information of to-be-pushed data.

In some embodiments of the present disclosure, if the to-be-pushed data is pushed, it indicates that the to-be-pushed data becomes pushed data during data push a next time. A push historical record of the to-be-pushed data may be recorded in the preset storage space, so that the preset storage space is updated, thereby ensuring real-time performance of pushed data.

In some embodiments of the present disclosure, the update module includes:

1) a second retrieval unit, configured to retrieve second mapping information from the identifier information of the to-be-pushed data, where the second mapping information is used for indicating the storage location corresponding to the identifier information of the to-be-pushed data;

2) a setting unit, configured to set a value stored at the storage location that is in the preset storage space and is indicated by the second mapping information to a second preset value; and 3) a processing unit, configured to: store push time of the to-be-pushed data at a first preset storage location of the preset storage space, and add 1 to a value stored at a second preset storage location, where the second preset storage location is used for storing an amount of pushed historical data recorded in the preset storage space.

In some embodiments of the present disclosure, the second retrieval unit is configured to: acquire a second hash value set corresponding to the identifier information of the to-be-pushed data, where the second hash value set includes a second preset quantity of hash values, and each of the second preset quantity of hash values corresponds to a storage location in the preset storage space; and the setting unit is configured to: set the value stored at the storage location indicated by each hash value in the second hash value set to the second preset value.

In some embodiments of the present disclosure, a second preset quantity of hash values corresponding to the identifier information of the to-be-pushed data may form the second hash value set, the second hash value set is used as the second mapping information retrieved from the identifier information of the to-be-pushed data, and information about the second hash value set is recorded in the preset storage space.

In some embodiments of the present disclosure, the setting unit is configured to: set the value stored at the storage location indicated by the second mapping information in one of the one or more first preset storage blocks that records storage time closest to current time to the second preset value if the value stored at the second preset storage location in the one of the one or more first preset storage blocks that records the storage time closest to the current time does not reach a first preset threshold, where the preset storage space includes the one or more first preset storage blocks.

In some embodiments of the present disclosure, the preset storage space may be divided into one or more first preset storage blocks. Information about to-be-pushed data is stored at a storage location corresponding to the second mapping information in one first preset storage block that records storage time closest to the current time. When the to-be-pushed data is stored, a storage upper limit may be set for an amount of pushed data that each first preset storage block stores. If an amount of pushed data stored in a current first preset storage block does not reach the upper limit, the information about the to-be-pushed data is stored in the current first preset storage block.

In some embodiments of the present disclosure, the setting unit is further configured to: allocate a second preset storage block in the preset storage space if the value stored at the second preset storage location reaches the first preset threshold; and set the value stored at the storage location that is in the second preset storage block and is indicated by the second mapping information to the second preset value.

In some embodiments of the present disclosure, if the foregoing check fails or a first configuration file fails to be downloaded, complete configuration information corresponding to a to-be-updated configuration object may be downloaded to update a configuration object, but this embodiment is not limited thereto. In some embodiments, the complete configuration information may be optimally compressed, but this embodiment is not limited thereto. If the configuration information is compressed information, the downloaded complete configuration information is decompressed, and a decompressed file is used as a configuration file of an updated configuration object.

In some embodiments of the present disclosure, a transmission protocol used to download the second configuration file may be, but is not limited to, the TCP protocol. The transmission protocol may alternatively be another protocol. Here, a private protocol may be used to download the second configuration file to improve the reliability of downloading the second configuration file.

In some embodiments of the present disclosure, the setting unit is further configured to: release storage space in one of the one or more first preset storage blocks that records storage time having a maximum difference value from the current time if a quantity of the one or more first preset storage blocks reaches a second preset threshold before the second preset storage block in the preset storage space is allocated.

In some embodiments of the present disclosure, if the amount of pushed data stored in the current first preset storage block already reaches the storage upper limit of the current first preset storage block, a second preset storage block is allocated in the preset storage space, and the information about the to-be-pushed data is stored in the newly allocated second preset storage block.

In some embodiments of the present disclosure, the device further includes:

1) a traverse module, configured to traverse one or more first preset storage blocks according to storage time recorded in the one or more first preset storage blocks, where the preset storage space includes the one or more first preset storage blocks; and 2) a release module, configured to release one of the one or more first preset storage spaces that records storage time earlier than preset time.

In some embodiments of the present disclosure, for a preset storage block having storage duration exceeding particular duration, a storage space of the preset storage block that expires may be released periodically, thereby improving the utilization of the preset storage space.

In one implementation, when duration of some blocks in the DBF has exceeded a preset time period, such data becomes useless in the storage space, and it may be chosen to eliminate and release the data. The first BF in the DBF has the longest storage duration, and sequential traversal may start from the first block start for elimination. Because the duration of the blocks in the DBF increases sequentially, when a block does not satisfy elimination duration, the traversal may be terminated. If the quantity of BFs in the DBF has reached the upper limit during capacity expansion, the first BF having the longest storage duration is eliminated first, and one block is eliminated each time. Accordingly, repetitive recommendation does not occur within a particular range.

FIG. 6 is a schematic diagram of a release method for a DBF according to an embodiment of the present disclosure. As shown in FIG. 6, recTime of each BF in a DBF represents recommendation duration that is stored latest. When a historical data push record stored in the DBF is read, traversal starts from the first block. When recTime of a BF exceeds preset duration, the BF may be released. During storage, if a quantity of allocated BFs reaches a restricted upper limit, a BF having longest recTime may be released, and a new BF is allocated.

An application environment of this embodiment of the present disclosure may be, but is not limited to, the application environment in Embodiment 1, and is not described again in this embodiment. This embodiment of the present disclosure provides an example of a specific application used for implementing the foregoing data push method.

In some embodiments, the foregoing configuration object update method may be applied to a scenario in which a server pushes data to a client, but this embodiment is not limited thereto. This embodiment provides a method for refreshing feeds infinitely. The method includes refreshing or pulling down, by a user, feeds; recommending data from a data pool, and querying and filtering out, by using a DBF, historical data that has been exposed to the user; and storing data of feeds that are about to be recommended in the DBF, and returning the data to a client for presentation. The DBF includes a plurality of bloom filters with a timestamp and a count, and has functions such as storage, dynamic capacity expansion, dynamic release, and query and filtering. A size of a bloom filter is designed based on a large amount of data of user behavior when data is pushed by using the DBF, and a quantity of bloom filters is adjusted dynamically in real time according to a quantity of articles used when the user refreshes feeds. The present disclosure resolves undesirable experience as a quantity of feeds increases as a quantity of users and a quantity of refreshes increase. For example, an article is pushed repeatedly, or data fails to be refreshed. In addition, costs are greatly reduced, and feeds are refreshed infinitely.

Figure 8:
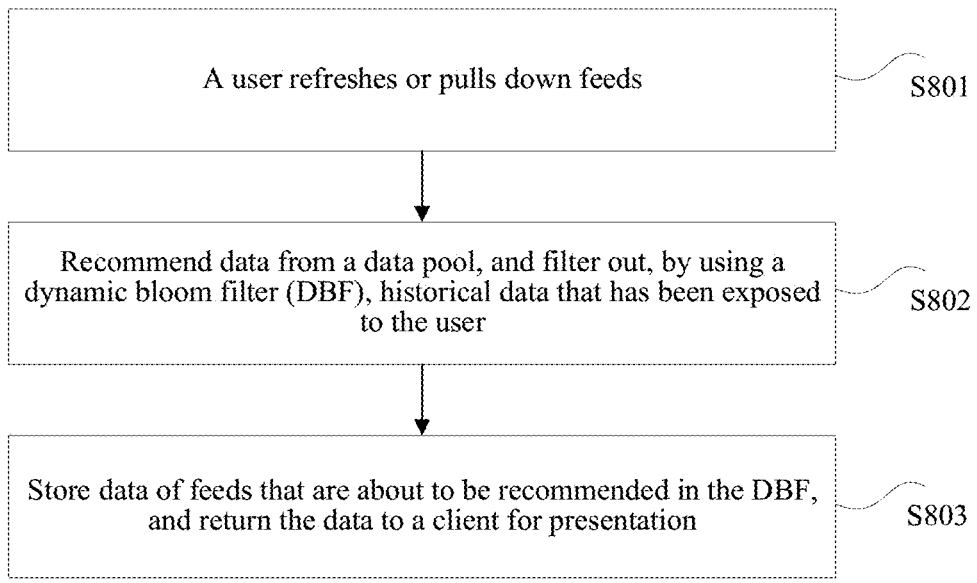
FIG. 8 is a flowchart of a feed refreshing method according to an embodiment of the present disclosure.

FIG. 8 is a flowchart of a feed refreshing method according to an embodiment of the present disclosure. A procedure includes the following steps:

Step S801: A user refreshes or pulls down feeds.

In some embodiments of the present disclosure, in a scenario of refreshing a feed page or pulling down a feed page to load data of more feeds, after the user refreshes once, when a refresh is operated or the feed page continues to be pulled down, load of data of feeds is triggered.

Step S802: Recommend data from a data pool, and filter out, by using a DBF, historical data that has been exposed to the user.

In some embodiments of the present disclosure, recommended data is acquired from the data pool. For docId of an article of data that needs to be recommended, k hash values are chosen. The DBF is used to query whether information corresponding to the k hash values is in a historical data push record. Exposed user historical data is filtered out if the information is in the historical data push record, to avoid repetitive recommendation.

Step S803: Store data of feeds that are about to be recommended in the DBF, and return the data to a client for presentation.

In some embodiments of the present disclosure, after data is filtered in step S802, data that is about to be exposed needs to be stored, and k hash values are chosen for the docId of the article of the data and are stored in a BF of the DBF.

In this embodiment, during implementation of the DBF, a BF space $$m = -\frac{n \ln p}{(\ln 2)^2}$$

of each bloom filter is calculated according to a total quantity n of articles stored in each BF and an acceptable mis-determination rate p. A quantity of optimal hash functions is $$k = \frac{m}{n} \ln 2.$$

A mis-determination rate of a BF is $f^{BF}(m,k,n)=p$. A plurality of BFs is independent of each other. If a quantity of BFs allocated in capacity expansion is r, a mis-determination rate of an element in r filled DBFs may be calculated to be $f^{DBF}(m,k,n,r)=1-(1-f^{BF}(m,k,n))^r$.

Figure 9:
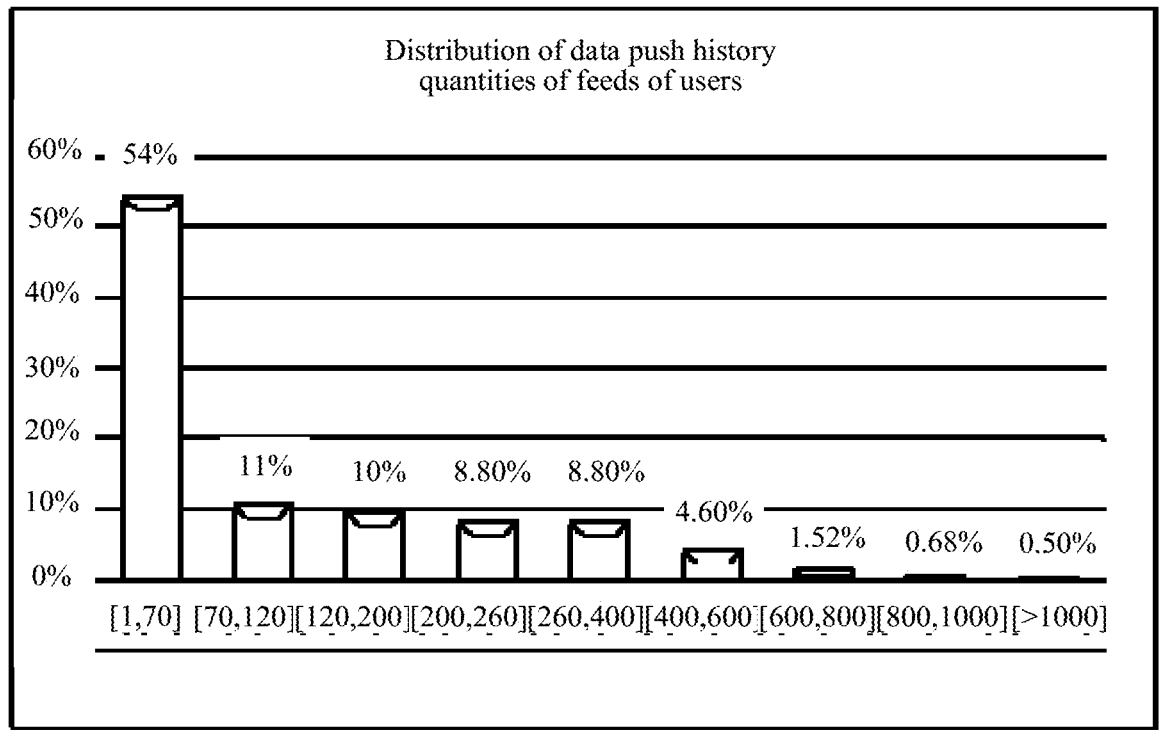
FIG. 9 is a schematic diagram of statistics of large amount of push data of users according to an embodiment of the present disclosure.

During actual use, statistics of large amount of push data of a user is shown in FIG. 9. For the distribution of quantities of records of users every day on average, a range from 1 to 70 accounts for 54%, a range from 70 to 120 accounts for 11%, a range from 120 to 200 accounts for 10%, and a range of the rest accounts for 25%. Therefore, in a recommendation history of a user, a storage quantity is designed to be n=70. A mis-determination rate of a BF cannot be excessively high. If the mis-determination rate is excessively high, many feed articles may be mis-determined and cannot be recommended. An acceptable mis-determination rate of a single BF is set to $f^{BF}(m,k,n)=p=0.5\%$. It may be calculated that a capacity space is $$m = -\frac{n \ln p}{(\ln 2)^2} = 773 \text{ bit}$$

and a quantity of optimal hash functions is $$k = \frac{m}{n} \ln 2 = 8,$$

and a mistaken determination rate of allocating a plurality of BFs by the DBF is $f^{DBF}(m,k,n,r)=1-(1-0.5\%)^r$. As a quantity r of BFs increases, $f^{DBF}(m,k,n,r)$ increases accordingly. On average, a data push quantity for a user in three days is 200, and a mis-determination rate is 1.5%. When a data push history quantity is 1000, a mis-determination rate is 6.8% and falls within an acceptable range. Therefore, through comprehensive consideration, parameters n=70, p=0.5%, m=773, and k=8 are selected. Assuming that on average 70 articles are refreshed every day, (70*32+4)*3=6732 bits are needed for historical records of three days in a conventional cache solution. When a solution using a DBF is used, (773+8)*3=2343 bits are needed for historical records of three days. Compared with the conventional cache solution, costs are reduced by 66%, and network time consumption is reduced.

In an actual process, an exception may be caused when a timeout occurs during reading of data history or data push history fails to be stored. As a result, data cannot be returned, or repetitive data is returned. In this embodiment, a randomization method with a specified subscript may be used to avoid the foregoing problems. To be specific, an average data push quantity of a user is calculated and used as a random start subscript of a data pool data push quantity to start to choose data randomly. Accordingly, problems related to data of feeds cannot be refreshed can be resolved, and users may obtain minimal repetitive content during refreshing.

Figure 10:
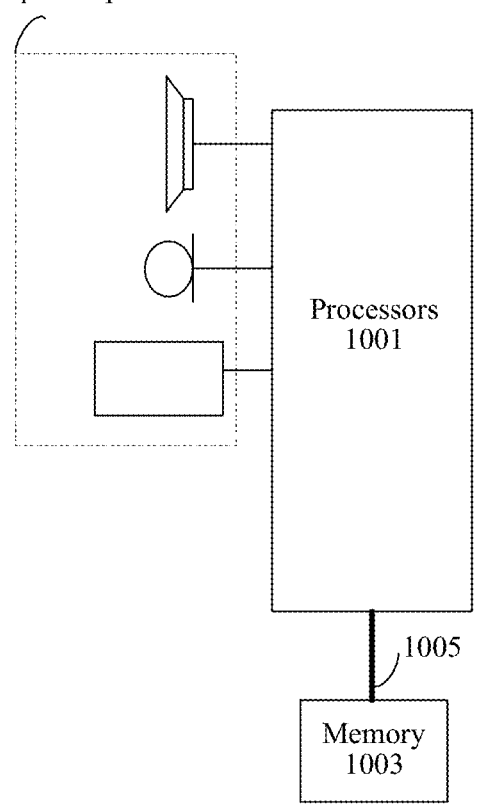
FIG. 10 is a schematic diagram of an electronic device according to an embodiment of the present disclosure.

According to an embodiment of the present disclosure, an electronic device configured to implement the foregoing data push method is further provided. As shown in FIG. 10, the electronic device may include one or more (only one processor 1001 is shown in the figure) processors 1001, a memory 1003, and a transmission device 1005. As shown in FIG. 10, the electronic device may further include an input/output device 1007.

The memory 1003 may be configured to store a computer program and a module, for example, a program instruction/module corresponding to a data push method and device in this embodiment of the present disclosure. The processor 1001 is configured to execute the software program and module stored in the memory 1003 to execute various function applications and data processing, that is, to implement the foregoing data push method. The memory 1003 may include a high-speed random access memory, and may further include a non-volatile memory, for example, one or more magnetic storage devices, a flash memory, or another non-volatile solid-state memory. In some examples, the memory 1003 may further include memories remotely disposed relative to the processor 1001. These remote memories may be connected to a terminal through a network. An example of the foregoing network includes, but is not limited to, the Internet, an Intranet, a local area network, a mobile communication network, and a combination thereof.

The transmission device 1005 is configured to receive or send data through one network, and may further be configured to transmit data between the processor and the memory. A specific example of the foregoing network may include a wired network and a wireless network. In an example, the transmission device 1005 includes a network interface controller (NIC). The NIC may be connected to another network device and router through a network cable to communicate with the Internet or a local area network. In an example, the transmission device 1005 is a radio frequency (RF) module and is configured to communicate with the Internet wirelessly.

Specifically, the memory 1003 is configured to store an application program.

The processor 1001 may use the transmission device 1005 to invoke the application program stored in the memory 1003 to perform the following steps: acquiring to-be-pushed data and identifier information of the to-be-pushed data, where the identifier information of the to-be-pushed data is used for uniquely identifying the to-be-pushed data; and pushing the to-be-pushed data if predetermined indication information is not stored at a target storage location in a preset storage space, where the target storage location includes a storage location corresponding to the identifier information of the to-be-pushed data, and the predetermined indication information is used for indicating identifier information of pushed data.

The processor 1001 is further configured to perform the following steps: retrieving first mapping information from the identifier information of the to-be-pushed data, where the first mapping information is used for indicating the storage location corresponding to the identifier information of the to-be-pushed data; and pushing the to-be-pushed data if the predetermined indication information is not stored at the storage location that is in the preset storage space and is indicated by the first mapping information.

The processor 1001 is further configured to perform the following steps: retrieving a first hash value set corresponding to the identifier information of the to-be-pushed data, where the first hash value set includes a first preset quantity of hash values, and each of the first preset quantity of hash values corresponds to one storage location in the target storage location; and pushing the to-be-pushed data if the first preset value is not stored at the storage location indicated by each hash value in the first hash value set.

The processor 1001 is further configured to perform the following steps: traversing one or more first preset storage blocks according to storage time recorded in the one or more first preset storage blocks, where the preset storage space includes the one or more first preset storage blocks; and pushing the to-be-pushed data if none of the one or more first preset storage blocks has the predetermined indication information stored at the target storage location.

The processor 1001 is further configured to perform the following step: updating the preset storage space according to the identifier information of the to-be-pushed data.

The processor 1001 is further configured to perform the following steps: retrieving second mapping information from the identifier information of the to-be-pushed data, where the second mapping information is used for indicating the storage location corresponding to the identifier information of the to-be-pushed data; setting a value stored at the storage location that is in the preset storage space and is indicated by the second mapping information to a second preset value; and storing push time of the to-be-pushed data at a first preset storage location of the preset storage space, and adding 1 to a value stored at a second preset storage location, where the second preset storage location is used for storing an amount of pushed historical data recorded in the preset storage space.

The processor 1001 is further configured to perform the following steps: acquiring a second hash value set corresponding to the identifier information of the to-be-pushed data, where the second hash value set includes a second preset quantity of hash values, and each of the second preset quantity of hash values corresponds to a storage location in the preset storage space; and the setting a value stored at the storage location that is in the preset storage space and is indicated by the second mapping information to a second preset value includes: setting the value stored at the storage location indicated by each hash value in the second hash value set to the second preset value.

the processor 1001 is further configured to perform the following step: setting the value stored at the storage location indicated by the second mapping information in one of the one or more first preset storage blocks that records storage time closest to current time to the second preset value if the value stored at the second preset storage location in the one of the one or more first preset storage blocks that records the storage time closest to the current time does not reach a first preset threshold, where the preset storage space includes the one or more first preset storage blocks.

The processor 1001 is further configured to perform the following steps: allocating a second preset storage block in the preset storage space; and setting the value stored at the storage location that is in the second preset storage block and is indicated by the second mapping information to the second preset value.

The processor 1001 is further configured to perform the following step: releasing storage space in one of the one or more first preset storage blocks that records storage time having a maximum difference value from the current time if a quantity of the one or more first preset storage blocks reaches a second preset threshold.

The processor 1001 is further configured to perform the following steps: traversing the one or more first preset storage blocks according to storage time recorded in the one or more first preset storage blocks, where the preset storage space includes the one or more first preset storage blocks; and releasing one of the one or more first preset storage spaces that records storage time earlier than preset time.

By using an embodiment of the present disclosure, a solution of a data push method is provided, so that the technical problem of excessively high storage costs of pushed data in the related technology is resolved.

In some embodiments of the present disclosure, for a specific example in this embodiment, refer to the examples described in the foregoing, and this embodiment is not described here again.

A person of ordinary skill in the art may understand that the structure shown in FIG. 10 is only schematic. The electronic device may be a smartphone (for example, an Android phone, and an iOS phone), a tablet computer, a palmtop computer, and a terminal device such as a mobile Internet device (MID) and a PAD. The structure of the foregoing electronic device is not limited in FIG. 10. For example, the electronic device may further include more or fewer components (for example, a network interface, and a display device) than those shown in FIG. 10, or have a configuration different from that shown in FIG. 10.

A person of ordinary skill in the art may understand that all or some of the steps of the various methods in the foregoing embodiments may be implemented by a program instructing relevant hardware of a terminal device. The program may be stored in a computer readable storage medium. The storage medium may be a flash memory drive, a ROM, a RAM, a magnetic disk, an optical disc, or the like.

An embodiment of the present disclosure further provides a storage medium. In some embodiments of the present disclosure, the foregoing storage medium stores a computer program, where the computer program is used for performing, when being run, a data push method.

In some embodiments of the present disclosure, the foregoing storage medium may be located in at least one of a plurality of network devices in the network shown in the foregoing embodiment.

In some embodiments of the present disclosure, the storage medium is configured to store program code used for performing the following steps:

S1: Acquire to-be-pushed data and identifier information of the to-be-pushed data, where the identifier information of the to-be-pushed data is used for uniquely identifying the to-be-pushed data.

S2: Push the to-be-pushed data if predetermined indication information is not stored at a target storage location in a preset storage space, where the target storage location includes a storage location corresponding to the identifier information of the to-be-pushed data, and the predetermined indication information is used for indicating identifier information of pushed data.

In some embodiments of the present disclosure, the storage medium is further configured to store program code used for performing the following steps:

S3: Retrieve first mapping information from the identifier information of the to-be-pushed data, where the first mapping information is used for indicating the storage location corresponding to the identifier information of the to-be-pushed data.

S4: Push the to-be-pushed data if the predetermined indication information is not stored at the storage location that is in the preset storage space and is indicated by the first mapping information.

In some embodiments of the present disclosure, the storage medium is further configured to store program code used for performing the following steps: retrieving a first hash value set corresponding to the identifier information of the to-be-pushed data, where the first hash value set includes a first preset quantity of hash values, and each of the first preset quantity of hash values corresponds to one storage location in the target storage location; and pushing the to-be-pushed data if the first preset value is not stored at the storage location indicated by each hash value in the first hash value set.

In some embodiments of the present disclosure, the storage medium is further configured to store program code used for performing the following steps: traversing one or more first preset storage blocks according to storage time recorded in the one or more first preset storage blocks, where the preset storage space includes the one or more first preset storage blocks; and pushing the to-be-pushed data if none of the one or more first preset storage blocks has the predetermined indication information stored at the target storage location.

In some embodiments of the present disclosure, the storage medium is further configured to store program code used for performing the following step: updating the preset storage space according to the identifier information of the to-be-pushed data.

In some embodiments of the present disclosure, the storage medium is further configured to store program code used for performing the following steps: retrieving second mapping information from the identifier information of the to-be-pushed data, where the second mapping information is used for indicating the storage location corresponding to the identifier information of the to-be-pushed data; setting a value stored at the storage location that is in the preset storage space and is indicated by the second mapping information to a second preset value; and storing push time of the to-be-pushed data at a first preset storage location of the preset storage space, and adding 1 to a value stored at a second preset storage location, where the second preset storage location is used for storing an amount of pushed historical data recorded in the preset storage space.

In some embodiments of the present disclosure, the storage medium is further configured to store program code used for performing the following steps: acquiring a second hash value set corresponding to the identifier information of the to-be-pushed data, where the second hash value set includes a second preset quantity of hash values, and each of the second preset quantity of hash values corresponds to a storage location in the preset storage space; and the setting a value stored at the storage location that is in the preset storage space and is indicated by the second mapping information to a second preset value includes: setting the value stored at the storage location indicated by each hash value in the second hash value set to the second preset value.

In some embodiments of the present disclosure, the storage medium is further configured to store program code used for performing the following step: setting the value stored at the storage location indicated by the second mapping information in one of the one or more first preset storage blocks that records storage time closest to current time to the second preset value if the value stored at the second preset storage location in the one of the one or more first preset storage blocks that records the storage time closest to the current time does not reach a first preset threshold, where the preset storage space includes the one or more first preset storage blocks.

In some embodiments of the present disclosure, the storage medium is further configured to store program code used for performing the following steps: allocating a second preset storage block in the preset storage space; and setting the value stored at the storage location that is in the second preset storage block and is indicated by the second mapping information to the second preset value.

In some embodiments of the present disclosure, the storage medium is further configured to store program code used for performing the following step: release storage space in one of the one or more first preset storage blocks that records storage time having a maximum difference value from the current time if a quantity of the one or more first preset storage blocks reaches a second preset threshold.

In some embodiments of the present disclosure, the storage medium is further configured to store program code used for performing the following steps: traversing the one or more first preset storage blocks according to storage time recorded in the one or more first preset storage blocks, where the preset storage space includes the one or more first preset storage blocks; and releasing one of the one or more first preset storage spaces that records storage time earlier than preset time.

In some embodiments of the present disclosure, the storage medium may include, but is not limited to a USB flash drive, a ROM, a RAM, a removable hard disk, a magnetic disk, an optical disc, among various other media that can store program code.

In some embodiments of the present disclosure, for a specific example in this embodiment, refer to the examples described in the foregoing Embodiment 1 and Embodiment 2, and details are not described herein again in this embodiment.

The sequence numbers of the foregoing embodiments of the present disclosure are merely for the convenience of description, and do not imply the preference among the embodiments.

If implemented in the form of software functional units and sold or used as an independent product, the integrated units in the foregoing embodiments may be stored in the foregoing computer readable storage medium. Based on this, the foregoing technical solutions of the present disclosure or the entire technical solution or the part that makes contributions to the prior art can be substantially embodied in the form of a software product. The computer software product may be stored in a storage medium and contain several instructions to instruct one or more pieces of computer equipment (for example, a personal computer, a server, or network equipment) to perform all or a part of the steps of the method described in the embodiments of the present disclosure.

In the foregoing embodiments of the present disclosure, the descriptions of the embodiments place different emphasis on different content, and for a part that is not detailed in an embodiment, reference can be made to the relevant descriptions of other embodiments.

In the embodiments provided by the present application, it should be understood that the clients disclosed may be implemented in other forms. For example, the device embodiments described above are merely exemplary. The division of units is merely logical functional division, and there are other division forms in real application. For example, a plurality of units or components may be combined or be integrated to another system, or some features may be ignored or not be executed. In another aspect, the coupling, direct coupling, or communication connection there between which is displayed or discussed may be indirect coupling or communication connection of interfaces, units or modules, and may be electrical or in other forms.

Units described as separate components may be or may not be physically separated. Components shown as units may be or may not be physical units, that is, may be integrated or allocated to a plurality of network units. Some or all of the modules may be selected to reaches the objective of the solution of the embodiment according to actual demands.

In addition, the functional units in the embodiments of the present disclosure may either be integrated in a processing unit, or each unit may be a separate physical unit. Alternatively, two or more of the units are integrated in one unit. The integrated unit may be implemented in the form of hardware, or may be implemented in the form of a software functional unit.

Only certain embodiments of the present disclosure are described. It should be noted by a person of ordinary skill in the art that modifications and variations may be made without departing from the principle of the present disclosure, which should be construed as falling within the protection scope of the present disclosure.

What is claimed is:

1. A data push device at a server, comprising one or more processors and one or more memories for storing computer program instructions, the computer program instructions being executed by the one or more processors, and causing the one or more processors to perform:
   receiving a data push request from a remote terminal;
   acquiring to-be-pushed data and identifier information of the to-be-pushed data response to the data push request, the identifier information of the to-be-pushed data uniquely identifying the to-be-pushed data;
   retrieving mapping information of the to-be-pushed data, the mapping information including a first hash value set obtained from the identifier information, the first hash value set comprising a first quantity of hash values, wherein each of the first quantity of hash values corresponds to one storage bit in a storage location;
   determining that indication information is not stored at a target storage location in a storage space on the server by determining that at least one storage bit in the target storage location indicated by a hash value in the first hash value set does not store a preset bit value, the indication information being not stored at the target storage location indicating that the to-be-pushed data have not been previously pushed to the remote terminal;
   pushing the to-be-pushed data to the remote terminal in response to determining that the indication information is not stored at the target storage location.

2. The device according to claim 1, wherein the one or more processors are further configured to:
   traverse one or more first storage blocks according to storage time recorded in the one or more first storage blocks, wherein the storage space comprises the one or more first storage blocks; and
   determine that none of the one or more first storage blocks have the indication information stored at the target storage location by determining that at least one storage bit in each of the one or more first storage blocks indicated by the hash value in the first hash value set does not store the preset bit value.

3. The device according to claim 1, wherein the one or more processors are further configured to:
   update the storage space according to the identifier information of the to-be-pushed data, wherein the to-be-pushed data becomes pushed data.

4. The device according to claim 3, wherein the one or more processors are further configured to:
   set a value stored at a candidate storage location that is in the storage space and is indicated by the mapping information of the pushed data to a preset value; and
   a processing unit, configured to: store push time of the pushed data at a first storage location of the storage space, and add 1 to a value stored at a second storage location, wherein the second storage location stores an amount of pushed historical data recorded in the storage space.

5. The device according to claim 1, wherein the one or more processors are further configured to:
   traverse the one or more first storage blocks according to storage time recorded in the one or more first storage blocks, wherein the storage space comprises the one or more first storage blocks; and
   release one of the one or more first storage spaces that records storage time earlier than a set time.

6. A data push method, comprising:
   receiving, by a server, a data push request from a remote terminal;
   acquiring, by the server, to-be-pushed data and identifier information of the to-be-pushed data in response to the data push request, the identifier information of the to-be-pushed data uniquely identifies the to-be-pushed data;
   retrieving, by the server, mapping information of the to-be-pushed data, the mapping information including a first hash value set obtained from the identifier information, the first hash value set comprising a first quantity of hash values, wherein each of the first quantity of hash values corresponds to one storage bit in a storage location;
   determining, by the server, that indication information is not stored at a target storage location in a storage space on the server by determining that at least one storage bit in the target storage location indicated by a hash value in the first hash value set does not store a preset bit value, the indication information being not stored at the target storage location indicating that the to-be-pushed data have not been previously pushed to the remote terminal; and
   pushing, by the server, the to-be-pushed data to the remote terminal in response to determining that the indication information is not stored at the target storage location.

7. The method according to claim 6, wherein the determining that indication information is not stored at a target storage location in a storage space comprises:
   traversing one or more first storage blocks according to storage time recorded in the one or more first storage blocks, wherein the storage space comprises the one or more first storage blocks; and
   determining that none of the one or more first storage blocks has the indication information stored at the target storage location by determining that at least one storage bit in each of the one or more first storage blocks indicated by the hash value in the first hash value set does not store the preset bit value.

8. The method according to claim 6, wherein after the pushing the to-be-pushed data, the method further comprises:
   updating the storage space according to the identifier information of the to-be-pushed data, wherein the to-be-pushed data becomes pushed data.

9. The method according to claim 8, wherein the updating the storage space according to the identifier information of the to-be-pushed data comprises:
   setting a value stored at a candidate storage location that is in the storage space and is indicated by the mapping information of the pushed data to a preset value; and
   storing push time of the pushed data at a first storage location of the storage space, and adding 1 to a value stored at a second storage location, wherein the second storage location stores an amount of pushed historical data recorded in the storage space.

10. The method according to claim 9, wherein
    the setting a value stored at a candidate storage location that is in the storage space and is indicated by the mapping information to a preset value comprises:
    for each hash value in the first hash value set, setting the value stored at the storage bit of the candidate storage location indicated by the hash value to the preset bit value.

11. The method according to claim 9, wherein the storage space comprises one or more first storage blocks, and the setting a value stored at a candidate storage location that is in the storage space and is indicated by the mapping information to a preset value comprises:

setting the value stored at the storage location indicated by the mapping information in one of the one or more first storage blocks that records storage time closest to current time to the preset value if the value stored at the second storage location in the one of the one or more first storage blocks that records the storage time closest to the current time does not reach a first threshold.

12. The method according to claim 11, wherein if the value stored at the second storage location in the one of the one or more first storage blocks that records the storage time closest to the current time reaches the first threshold, the method further comprises:

allocating a second storage block in the storage space; and setting the value stored at the storage location that is in the second storage block and is indicated by the mapping information to the preset value.

13. The method according to claim 12, wherein before the allocating a second storage block in the storage space, the method further comprises:

releasing storage space in one of the one or more first storage blocks that records storage time having a maximum difference value from the current time if a quantity of the one or more first storage blocks reaches a second threshold.

14. The method according to claim 6, further comprising:

traversing the one or more first storage blocks according to storage time recorded in the one or more first storage blocks, wherein the storage space comprises the one or more first storage blocks; and releasing one of the one or more first storage spaces that records storage time earlier than a set time.

15. A non-transitory computer-readable storage medium storing computer program instructions executable by at least one processor of a server to perform:

receiving a data push request from a remote terminal;

acquiring to-be-pushed data and identifier information of the to-be-pushed data in response to the data push request, the identifier information of the to-be-pushed data uniquely identifies the to-be-pushed data;

retrieving mapping information of the to-be-pushed data, the mapping information including a first hash value set obtained from the identifier information, the first hash value set comprising a first quantity of hash values, wherein each of the first quantity of hash values corresponds to one storage bit in a storage location;

determining that indication information is not stored at a target storage location in a storage space on the server by determining that at least one storage bit in the target storage location indicated by a hash value in the first hash value set does not store a preset bit value, the indication information being not stored at the target storage location indicating that the to-be-pushed data have not been previously pushed to the remote terminal;

pushing the to-be-pushed data to the remote terminal in response to determining that the indication information is not stored at the target storage location.

* * * * *